US008479108B2

(12) United States Patent
Yuen et al.

(10) Patent No.: US 8,479,108 B2
(45) Date of Patent: Jul. 2, 2013

(54) METHODS AND SYSTEMS FOR SHAREABLE VIRTUAL DEVICES

(75) Inventors: Paul Man-Wing Yuen, Hong Kong (CN); Calvin Man-Lap Yuen, Hong Kong (CN)

(73) Assignee: Vaka Corporation, Grand Cayman (KY)

( * ) Notice: Subject to any disclaimer, the term of this patent is extended or adjusted under 35 U.S.C. 154(b) by 0 days.

(21) Appl. No.: 13/117,636

(22) Filed: May 27, 2011

(65) Prior Publication Data

US 2011/0289437 A1 Nov. 24, 2011

Related U.S. Application Data

(63) Continuation of application No. 12/936,793, filed as application No. PCT/IB2009/005802 on Apr. 21, 2009, now abandoned.

(60) Provisional application No. 61/125,059, filed on Apr. 21, 2008.

(51) Int. Cl.
*G06F 9/4443* (2006.01)

(52) U.S. Cl.
USPC .......................................................... 715/762

(58) Field of Classification Search
USPC .......................................................... 715/762
See application file for complete search history.

(56) References Cited

U.S. PATENT DOCUMENTS

| | | | | |
|---|---|---|---|---|
| 6,097,384 A | * | 8/2000 | Alecci et al. | 715/767 |
| 2006/0005207 A1 | * | 1/2006 | Louch et al. | 719/328 |
| 2006/0015818 A1 | | 1/2006 | Chaudhri et al. | |
| 2006/0277481 A1 | * | 12/2006 | Forstall et al. | 715/764 |
| 2007/0101297 A1 | * | 5/2007 | Forstall et al. | 715/841 |
| 2007/0112714 A1 | * | 5/2007 | Fairweather | 706/46 |
| 2007/0162850 A1 | | 7/2007 | Adler et al. | |
| 2007/0266093 A1 | * | 11/2007 | Forstall et al. | 709/204 |
| 2008/0040426 A1 | | 2/2008 | Synstelien et al. | |
| 2008/0055273 A1 | * | 3/2008 | Forstall | 345/173 |
| 2008/0086319 A1 | | 4/2008 | Berger | |
| 2008/0120336 A1 | * | 5/2008 | Bergman et al. | 707/104.1 |
| 2008/0195483 A1 | * | 8/2008 | Moore | 705/14 |
| 2009/0063502 A1 | * | 3/2009 | Coimbatore et al. | 707/10 |
| 2009/0164653 A1 | * | 6/2009 | Mandyam et al. | 709/231 |
| 2010/0064233 A1 | * | 3/2010 | Dewar et al. | 715/760 |

FOREIGN PATENT DOCUMENTS

CN 1959679 5/2007

* cited by examiner

*Primary Examiner* — Matt Kim
*Assistant Examiner* — Ryan Barrett
(74) *Attorney, Agent, or Firm* — Merchant & Gould

(57) ABSTRACT

An intelligent virtual device, which is a widget, as well as a widget container that allows users and providers to manage the display, layout and navigation of widgets, and which is a part of a distributed infrastructure where users can freely subscribe, embed/publish, and organize a multitude of virtual devices according to their interests. In addition, the virtual device is also designed to facilitate a seamless content/information update or service access flow by integrating with other applications that control functions including but not limited to those related to content capturing, personal information management and communication management. The virtual device also serves as a flexible and internet-accessible device user interface and component platform for hardware and software providers to customize their hardware and software offerings.

11 Claims, 13 Drawing Sheets

METHODS AND SYSTEMS FOR SHAREABLE VIRTUAL DEVICES

This application is a Continuation Application of Ser. No. 12/936,793, filed 7 Oct. 2010 in the United States, which is a National Stage Application of PCT/IB2009/005802, filed 21 Apr. 2009, which claims benefit of Ser. No. 61/125,059, filed 21 Apr. 2008 in the United States and which applications are incorporated herein by reference. To the extent appropriate, a claim of priority is made to each of the above disclosed applications.

BACKGROUND OF THE INVENTION

I. Field of the Invention

The present invention generally relates to methods and systems relating to data processing and Graphical User Interfaces (GUI) of Computer Systems; including those for common personal computers, laptop computers, personal data assistants, advanced wireless communications devices having embedded computational applications, "thin" client front-end systems (relying on server bases CPU engines), distributed computing systems, and the likes. More particularly, the invention relates to (multimedia) content sharing, widgets, web services, online communications and interactions.

II. Background Information

In today's Internet, users can easily share contents with one another through content sharing services. For example, photo gallery services such as PhotoBucket and Flickr® provide users with the ability to create albums with various effects to be shared with friends. Video sharing services such as YouTube allows users to post clips and even create channels containing multiple clips that can be subscribed to by followers. There are many other services that allow users to create different types of personalized content that may be shared with others on the Internet, e.g. Amazon's Wish-List or Last.fm's music play-list. Long presented on conventional web pages, often, the content that enables these services may also be made available in the form of widgets. Widgets are mini-applications having a compact visual representation that can be embedded in another application and can be distributed virally across the Internet. Prior art US20060015818A1 defines a widget framework called "dashboard" that facilitates widget management and interaction on a desktop environment. The defining characteristic of a widget is to provide a single interaction point for the direct manipulation of a given kind of data. Widgets are basic visual building blocks which, combined in an application, hold all the data processed by the application and the available interactions on this data.

As more and more types of personalized Web content emerged, online aggregation sites emerged. There are two main categories of aggregation sites, those that are social-network oriented and those that are start-page oriented. Examples of social-network oriented aggregation sites are Facebook and MySpace. Both Facebook and MySpace allow different types of personalized contents or widgets to be added to the user's profile, and enable friends and followers within a social-network to track each other's latest statuses and activities. It is typical to see very long profile pages containing many widgets on a personalized social-network oriented aggregation site. Viewers of such sites are often overwhelmed by the amount of information presented on site pages. Examples of start-page oriented sites are iGoogle, Netvibes, and Pageflakes. These sites aggregate different types of personalized contents and services together by encapsulating the contents and services as widgets. Users may then select a desired widget of interest to be added to their respective start-pages. Widget-based start-page technologies can be interpreted as online versions of the dashboard framework described in prior art US20060015818A1. As with individual widgets, start-pages themselves may be published and shared among users. Services such as yourminis.com have implemented the necessary infrastructure to support the publishing and sharing of such start-pages.

There is a need for an application that pushes the sharing of start-pages one step further by treating each start-page as a widget/virtual device. In such a system the virtual device shall function as a compact container capable of storing different types of customized or personalized contents or services, including but not limited to news, photos, audios, videos, clips, play-lists, wish-lists, as well as communications and presence-related services. Different from prior art start-page technologies, there is a need for a virtual device designed operatively configured as a widget itself, which may therefore be easily embedded in sites with widget embedment support. There is a need for a virtual device that allows users to enjoy the benefit of both viral distribution and embedment, similar to the many widgets currently distributed across the Internet. Such a virtual device would allow start-page configured content to be readily shared. There is also a need for a virtual device that allows for different layout configurations when the device is embedded in different environments. There is also a need for a virtual device that may be configured to different sizes and may optimize the layout and navigation of widgets contained therein according to a user's specification and the amount of space available on a display for an application to provide output; by doing so, the virtual device can alleviate the problems associated with widget crowdedness found in many of today's social-networking sites without implemented any changes to those sites.

In traditional start-page technologies, users interact directly with individual widgets contained in the start-pages to make changes to their settings and contents, or access the services provided by the widgets. There is a need for an application that provides a set of centralized functions that enables the widgets contained within the application to provide the underlying service implementation. There is a need for an application that enables one-click access to the centralized functions, such as for example, content capturing, personal information management and communication. There is also a need for an application that is configured in a manner so as to allow shortcuts for accessing the centralized functions which may optionally be added in $3^{rd}$-party applications installed in the same environment, such as voice calling, messaging and presence-related applications that may be integrated with the virtual device in a similar manner.

SUMMARY OF THE INVENTION

Consistent with embodiments of the present invention, systems and methods are disclosed for an intelligent virtual device, which operatively performs as a widget, as well as a widget container that allows users and providers to manage the display, layout and navigation of widgets, and which is a part of a distributed infrastructure where users can freely subscribe, embed and organize a multitude of virtual devices according to their interests. In addition, the virtual device, implemented by the systems and methods of the present invention is also designed to facilitate a seamless content/information update or service access flow by integrating with other applications that control functions including but not limited to those related to content capturing, personal information management and communication management.

It is to be understood that both the foregoing summary of the invention and the following detailed description are exemplary and explanatory only, and should not be considered restrictive of the scope of the invention, as described and claimed. Further, features and/or variations may be provided in addition to those set forth herein.

BRIEF DESCRIPTION OF THE DRAWINGS

The accompanying drawings, which are incorporated in and constitute a part of this disclosure, illustrate various embodiments and aspects of the present invention. In the drawings.

GENERAL DESCRIPTION

Figure 1:
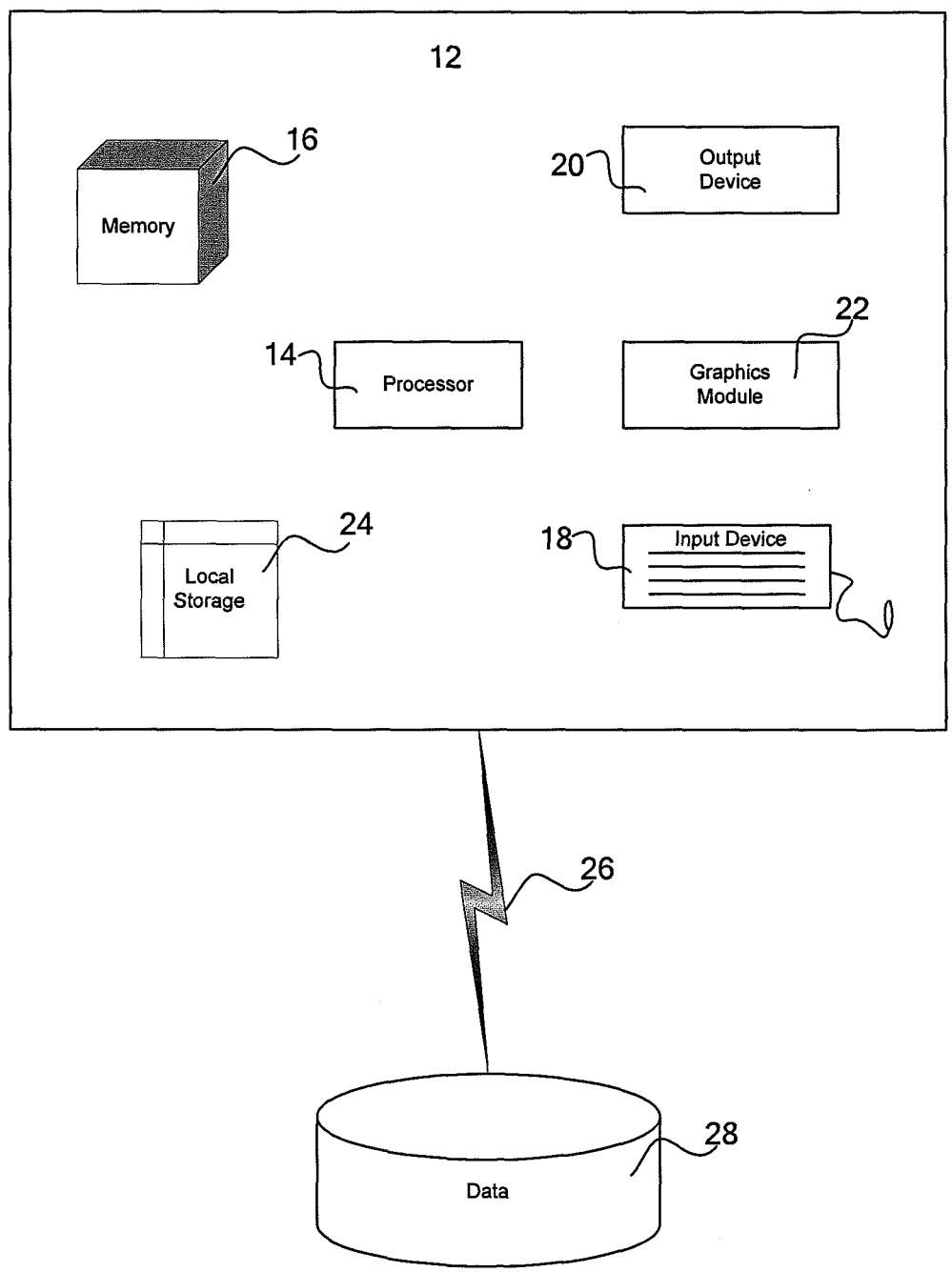
FIG. 1 is a block diagram depicting an overall architecture for implementing the present invention according to one embodiment.

Consistent with embodiments of the present invention, systems and methods are disclosed for an intelligent virtual device that operatively performs as a widget, as well as a widget container that allows users and providers to manage the display, layout and navigation of widgets, and which is a part of a distributed infrastructure where users can freely subscribe, embed and organize a multitude of virtual devices according to their interests. In addition, the virtual device, implemented by the systems and methods of the present invention is also designed to facilitate a seamless content/information update or service access flow by integrating with other applications that control functions including but not limited to those related to content capturing, personal information management, privacy management, and communication management.

An object of the invention is a system and method for providing an intelligent widget container module operatively configured to optimize the organization, display, layout and navigation of widgets within the amount of space available on a display for an application to provide output according to the environment, the role of the viewer (owner vs. visitor) as well as meta data associated with a widget, including but not limited to data representative of widget type and classification. Another object of the invention is to provide an intelligent widget container module including a viewer that tracks the viewing of widgets contained within the module, wherein the module is operatively configured to facilitate viewing and other usage statistics of the container module as well as the widgets housed within the module. Another object of the invention is to provide information to the viewers utilizing the widget container module as to whether the module itself has been updated or whether any of the widgets contained within the module have been updated so that viewers may quickly and easily focus on specific widgets of interest.

Another object of the invention is to implement the widget container module as a functioning widget so that it may be embedded within current commercially available widget containers currently being provided, including but not limited to the widget containers provided by Apple, Google, Microsoft, Opera, Netvibes, and Pageflakes. The widget container may also be added as an HTML embedded object to any web site, or as an extension to web browser applications, e.g. Miscrosoft Internet Explorer, Firefox, etc.

Another object of the invention is to provide a widget container module that provides for centralized addition and deletion of widgets and the centralized management of tasks associated with widgets. For example, it is contemplated that the widget container module may be embedded in the profile section of multiple social-networking sites, and the owner may update those sites in a centralized manner by simply updating the widget container module. The owner may add and delete widgets from all sites associated with the widget container module by updating the widgets contained within the module. In one embodiment, the widget container module is represented as a virtual device in order to promote a more intuitive association of the functions typically found in mobile phones, PDAs or other portable computing and entertainment devices.

Another object of the invention is to allow users to identify and package widgets desired to be included in the widget container module for sharing purpose. In addition, the widget container module is configured to allow users to customize and personalize the appearance of the virtual device for entertainment or branding purposes. It is also configured to simplify the manner in which users update or access widgets associated with the virtual device. This is accomplished by providing shortcuts and allowing integration of widget update or access flow with related applications in the same environment.

Another object of the invention is to allow users to subscribe and group together virtual devices for easy viewing of interested contents supplied by different users, or to access services offered by interested providers. In addition, the widget container module allows users to control the privacy level of the virtual device or widgets contained within the virtual device. The access control can be token based, access-control list based, or even based on the relationship between owner and user accessing the virtual device within an associated social-network. It also allows businesses to customize a virtual device or to create branded virtual devices to promote their respective services and content. The widget container module also allows widgets contained within the virtual device to appear as a slide show for auto playback.

DETAILED DESCRIPTION

The following detailed description refers to the accompanying drawings. Wherever possible, the same reference numbers are used in the drawings and the following description to refer to the same or similar parts. While several embodiments and features of the invention are described herein, modifications, adaptations and other implementations are possible, without departing from the spirit and scope of the invention. Rather these embodiments are provided so that this disclosure will be complete and will fully convey the invention to those skilled in the art. For example, substitutions, additions or modifications may be made to the components illustrated in the drawings, and the methods described herein may be modified by substituting, reordering or adding steps to the disclosed methods. Accordingly, the following detailed description does not limit the invention. Instead, the proper scope of the invention is defined by the appended claims.

In one embodiment, the present invention is implemented as an intelligent virtual device that runs on a personal computer, workstation, handheld computer, mobile device, consumer electronics device, or the like. One example of an implementation of the present invention is in a personal computer running the Windows XP operating system. Referring now to FIG. 1, there is shown an example of architecture for a system 10 for implementing the present invention. Personal computer 12 includes processor 14, memory 16, input devices 18 such as keyboard and mouse, and output device 20 such as a display monitor. A graphics module 22, such as a graphics card, may be provided for generating output for output device 20. A user interacts with system 10 by providing input via input devices 18 and viewing output via output device 20. Computer 12 also includes local storage 24, such as a hard drive, and can also include network connection 26 for accessing remote server 28. These components are well-known hardware components commonly used for running software applications. In one embodiment, software embodying the invention is provided on a computer-readable medium such as local storage 24.

An embodiment of the present invention may be used to generate an intelligent virtual device, which is a graphical representation and software implementation of a physical device, i.e. looking and functioning like a like a physical device by having similar graphical form factors, software user flows, and functions. One embodiment is a software implementation and graphical representation of a phone device. Implementing a phone device through the intelligent virtual device of the present invention gives a system user the visual impression of an actual phone device along with the functionality of a phone device for communication, entertainment, and personal information management. In addition to being implemented as a client application, the virtual device may as also be implemented as a widget. As a widget, the virtual device is embedded in other contexts, e.g. webpages, other applications etc. The virtual device also performs as widget container, containing and managing a plurality of different standard and customizable widgets. A widget container is a module that allows users and providers to manage the display, layout and navigation of widgets.

The virtual device is also a part of a distributed infrastructure through which users can freely subscribe, embed and organize a multitude of virtual devices according to their interests. Users may subscribe to multiple virtual devices and organize them under user-defined categories. As a sample embodiment, the subscription and organization of virtual devices may be implemented via a standard relational database through which all subscription association relationships between the user and virtual device entities as well as parent-child relationships in user-defined categorization can be managed. The virtual device, as a widget, may also be shared and embedded in web sites and in software application in the manner typical widgets currently available and in use in the marketplace are embedded. Embedding widgets may be accomplished simply through the adding standard HTML code fragments representing the widget to the website containing an HTML page.

Widgets are mini-applications having a compact visual representation that can be embedded in another application and can be distributed virally across the Internet. Widgets were invented to provide easy access to frequently used functions and information. Typical widgets include news aggregators, clocks, calculators, calendars, desktop notes and weather forecasts. In recent years, as the popularity of social-networks has increased, a new class of widgets was developed to allow individuals to share with their friends and other Internet users interesting web clips, pictures, or other things that relate to the individual. For example, those widgets may process raw content to provide certain visual effects and they are usually embedded within web pages to be shared with the page viewers. Through use of the virtual device module and widget container functions, the virtual device takes widget storing and placement on web sites to a new level by facilitating a seamless content/information update or service access flow by integrating with other applications that control functions including but not limited to those related to content capturing, personal information management and communication management.

During operation of a virtual device, a user opens and authenticates their virtual device from a computing device which can be a personal computer, laptop computer, personal data assistant, advanced wireless communications device, or a "thin" client front end system. The virtual device application retrieves the device handle associated with the user either from a centralized server or in a peer-to-peer manner has described previously in the document. Next, in an example where the user may want to share photographs taken at a recent event, the user may select a photo album widget from the widget gallery plug-in and add the widget to the virtual device for sharing. The user may further personalize the appearance of the photo widget available in the virtual device. After the user has completed basic configuration, the user then publishes the virtual device either through the publish manager or by copying the embed code to the relevant sites. As described previously in the description of the publish manager, the publish manager will integrate with the publishing application programming interface (API) of the targeted sites by calling their relevant methods and functions in their given API languages to facilitate an automated upload of a widget to the targeted site. The user can further customize the layout of the device published to each site. For example, the user may want the device to occupy a larger space in MySpace.com, and a smaller space in Facebook.com. As a result, the user may configure the device to be able to show 2 widgets at a time in MySpace.com while showing only 1 widget at a time at facebook.com. The user can repeat step 1 to 4 anytime to update the virtual device in a centralized manner. Viewers should be able to see the changes from any of the sites where the virtual device has been published.

Since there are multiple widget standards currently available, widgets have been created using a variety of technologies including but not limited to AJAX, Flash, Silverlight, Java, and .NET. The widget container of the present invention may also be built using any of the widget standards currently available. However, widget containers developed according to one standard and technology may not be suitable to contain or to display widgets made using a different standard or developed using a different technology. Therefore, it is conceived that the present invention can be implemented in all permutations of standard and technologies to satisfy different usage requirements.

Figure 2:
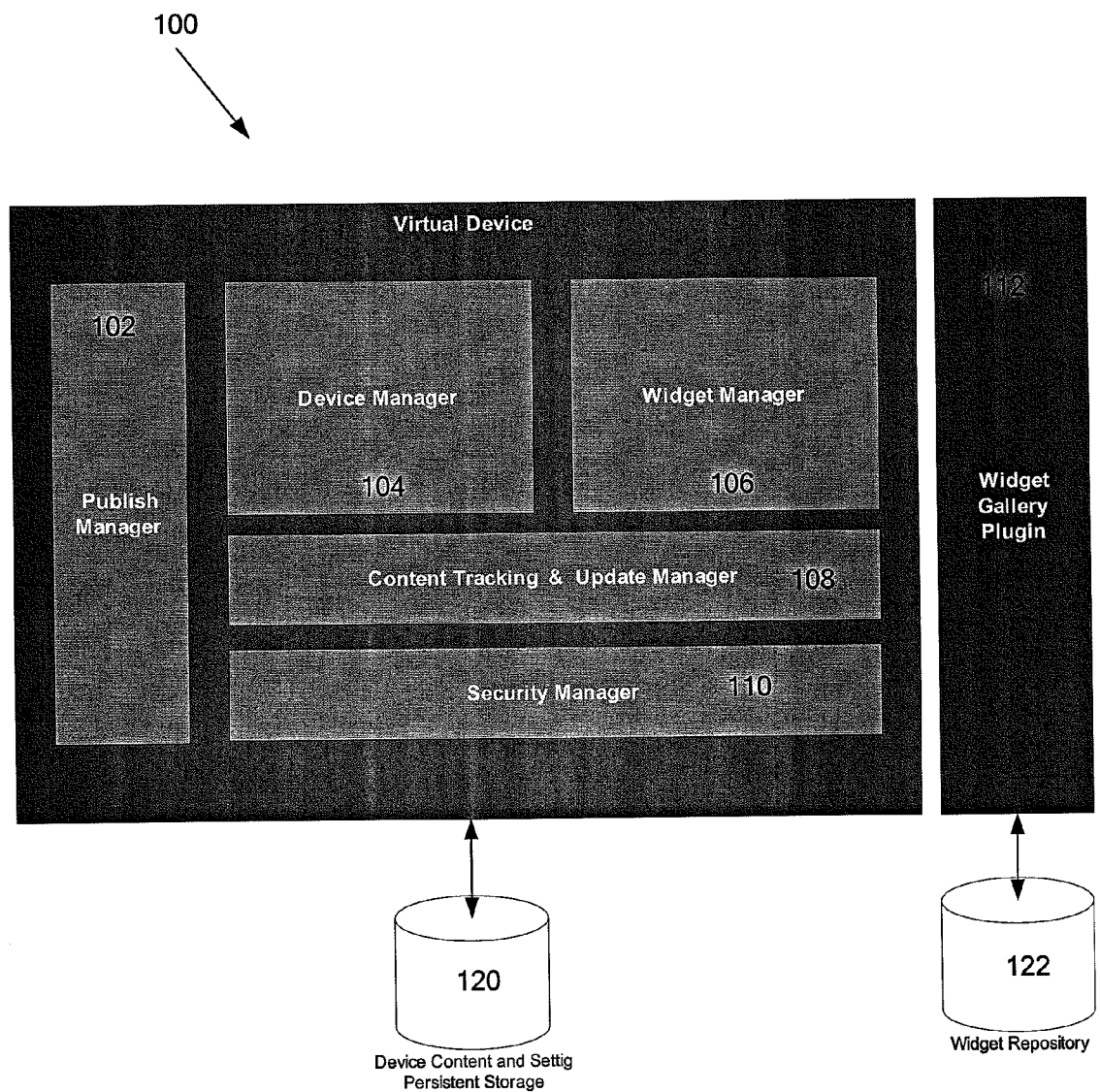
FIG. 2 is a block diagram depicting the architecture and components of the virtual device module and the widget gallery plug-in module.

As illustrated in FIG. 2, the virtual device module 100 represents the core of the present invention. It is responsible for managing the widgets contained in the virtual device, managing the rendering and navigation of the widgets, personalizing the virtual device, and for enabling the virtual devices to function as a widget that can be embedded in compatible widget containers. As illustrated in FIG. 2, the virtual device module 100 is divided into the following components, a publish manager 102, a device manager 104, a widget manager 106, a content tracking and update manager 108, a security manager 110 and a widget gallery plug in 112 that retrieves widgets from a widget repository 122. The virtual device module 100 retrieves from and updates a persistent storage 120 its contents and settings through the publish manager 102, device manager 104, widget manager 106, content tracking and update manager 108, and security manager 110.

The device manager 104 manages the storage and retrieval of data settings utilized to create the graphical representation of the virtual device. The virtual device setting can be represented as an XML document in a flat file or a set of tables in a standard relational database. The setting may contain but is not limited to information that may be represented as numbers, and that may be related to the appearance of the device, and the navigation of widgets within the device. The appearance of the device and navigation of widgets are furthered explained in the following paragraphs. Each virtual device is identified by a device handle, which is a unique identifier possibly represented as a HEX string e.g. H835093GAJSLDFKJ093 The actual settings may be stored locally, in centralized servers 120, or in a peer to peer manner. In the centralized approach, there may be device lookup servers 120 that are operatively configured to help find and cache device settings and meta-data information. For example a device handle such as H835093GAJSLDFKJ093@virtualdevicelookup.org indicates that the virtual device setting can be retrieved from the domain virtualdevicelookup.org, and the specific virtual device to look for within the domain is H835093GAJSLDFKJ093. In the case of peer to peer approach, the device handle maybe coupled with a torrent so that the corresponding setting can be retrieved through common peer to peer file sharing, such as Bit Torrent, currently available in the market.

The device manager 104 also manages the amount of space available on the display screen for the device and the laying out of widgets. In one embodiment, the device manager 104 may use the dimensions of the amount of space available on a display and evaluate that against the amount of display space needed by the widgets. If there is enough space to display multiple widgets, the virtual device may determine and select to display two widgets within the space available instead of one widget at a time on within the space. It is also contemplated that the widget layout may be dependent on the classification of a widget or attribute-based sorting and filtering. For example, the virtual device may partition its display area into a "news" area and a "photos" area. The "news" area will only display widgets that are classified as "news" widgets, and the "photos" area will only display widgets that are classified as "photos" widgets. Within the same category, widgets may be sorted and filtered according to the most recent update time.

Moreover, the device manager 104 controls the navigation of widgets, and controls the widgets that are visible within the virtual device 100 at any point in time. In one embodiment, the device manager 104 may contain a list of navigational buttons, examples of which can be found in FIG. 10. By clicking on the different navigational buttons, the user may access the plurality of different widgets contained in the device 100. The device manager 104 detects when the virtual device 100 is idle. When the virtual device 100 is idle, the device manager 104 will start the auto playback of widgets according to a defined playback sequence. To perform idle detection, the device manager 104 may listen to mouse events, and start the auto playback function when the mouse goes outside of the screen area of the virtual device 100.

Furthermore, the device manager 104 manages the appearance of the virtual device 100. It contains a device catalog where a user may pick and choose the desired appearance for a device. The device catalog includes a plurality of appearances such as, the ones shown in FIG. 12 Users may also optionally submit compatible device appearance implementation to the device manager 104 so that the submitted device appearance or skin can be chosen by the submitted or other users on the Internet. By way of embodiment, in one embodiment, the device 100 appearance may be implemented as an Adobe Flash file, and the file may be shared either in a client-server or peer-to-peer manner. In the case of a peer to peer approach, similar to a device handle, the appearance handle should be sufficient for the device manager 104 to identify the location of where the files associated with the appearance of the device are to be retrieved. Optionally, there may be lookup servers to help find and cache device 100 appearance files and meta-data information.

The widget manager 106 allows a user to choose the widgets to be included in the virtual device 100. Widget collection information is stored on a per device basis and is persisted in either local or centralized storage. Furthermore, the widget manager 106 deals with the specific details of the rendering of widgets. As a sample embodiment, the widget manager 106 may render each widget of the device 100 within an IFRAME within an HTML webpage so that each widget can enjoy its own security compartment of scripting and content rendering.

Moreover, the widget manager 106 manages the storage and retrieval of individual widget settings. For example, in an embodiment utilizing HTML-based widgets, it is contemplated that some of the widget implementation may rely on the specific settings within the HTML embed code in order to configure the widget properly. The widget manager 106 associates each customized setting with a widget handle. For example, a weather widget may have a setting in XML format that tells the weather widget the city that the user is interested in. In this case, the widget manager externalizes the city setting and creates a corresponding widget handle that can be used to retrieve that city setting. The handle may refer to a setting stored locally, in centralized servers, or in a peer to peer manner. In the case of peer to peer approach, similar to device handle, the widget handle may include a torrent that allows the device manager to locate and retrieve the associated setting through typical peer-to-peer file sharing methods. Optionally, there may be widget lookup servers to help find and cache widget settings.

In another embodiment, the widget manager 106 may collaborate with the device manager 104 to determine the mapping of the common native functions, such as for example, a device camera photograph capturing function, defined by the device manager 104 to the widgets that support those defined functions. For example, through the use of a camera integrated with the physical device, the user may take new pictures through the camera function in the physical device upon which the virtual device module is implemented. The user may then highlight the pictures the user likes and selects a "save to virtual device" function from the physical device native camera application to that saves the highlighted pictures to the virtual device. The virtual device receives the event and determines which widgets support photo upload by inspecting the widget meta-data information. Next, the virtual device graphical interface appears and presents a list of widgets that support photo upload service to the user. The virtual device coordinates the upload of the new pictures to the photo album widget service. The widget service may directly support the upload protocol defined by the virtual device programming interface; alternatively, an adaptation server can be used to coordinate the upload. In this example where the virtual device 100 is notified when the user has just taken a photo, the virtual device 100 can in turn check with the contained widgets to see if any of the widgets supports photo upload, and prompts the user to choose a widget through which the photo taken by the device will be uploaded to the widget photo gallery service in a seamless flow.

The security manager 110 is responsible for the authenticating of users of the virtual device 100 and determining whether a device upon which the virtual device 100 is embedded or a widget in a device is accessible by its viewer. The access control scheme can be token-based or access-control-list based, and should be of similar nature to those access control schemes currently available in the market. The present invention can optionally be integrated with a community or social-networking module so that the access control can also be governed by the relationship of the viewer and owner within the social-network and how close they are within the social-network.

The content tracking and update manager 108 informs the viewers whether the virtual device 100 has been updated or any of the widgets contained therein have been updated so that viewers can quickly and easily focus on the widgets of interests. For authenticated users, the content tracking and update manager 108 tracks the viewing time of the virtual device 100 and widgets to determine which content has been updated since a last viewing. For guest viewers, i.e., viewers that have not been authenticated, the content tracking and update manager 108 will report the collection of widgets that have been updated within a specific period of time, for example in the last 3 days.

The virtual device manages the customized settings of different widgets and allows certain settings to be shared across widgets. For example, when a virtual device user enters "Tokyo" as reference data for the weather widget, the virtual device transmits the "City" reference data to other widgets. When the user opens the map widget, because the virtual device has already transmitted the "City" reference data as Tokyo, the map widget will automatically show "Tokyo" downtown as its default. Common data where update manager allows sharing of these settings will be done through tag sharing where the virtual device facilitates the pulling of information from input fields. Tag sharing allows for data to be pulled and shared within associated fields across widgets having the same or associated naming patterns. If the naming field is both called city, the virtual device will share that data as the default starting point. It is to be understood that with the exception of "mash-up" widgets, where two widgets are pre-hardwired, individual widgets may simply store their own respective settings and do not have the ability to share. In this embodiment, nothing is "hardwired" other than through the use of a semantic tag system that enables the virtual device to identify common settings to be shared across widgets.

The publish manager 102 helps with the publishing of the virtual device 100 to popular web 2.0 sites. The publish manager 102 integrates with the publishing application programming interface (API) of the targeted sites by calling their relevant methods and functions in their given API languages to facilitate a fully automated widget embedment flow to the supported sites. Alternatively, the user can also copy the embed code representing the virtual device 100 and manually update the interested websites.

The widget gallery plug-in 112 represents a catalog of widgets that may be selected by the user to be added to the virtual device 100. The widget gallery plug-in 112 collaborates with the virtual device module 100 so that widgets may be easily added to the virtual device 100.

Figure 4:
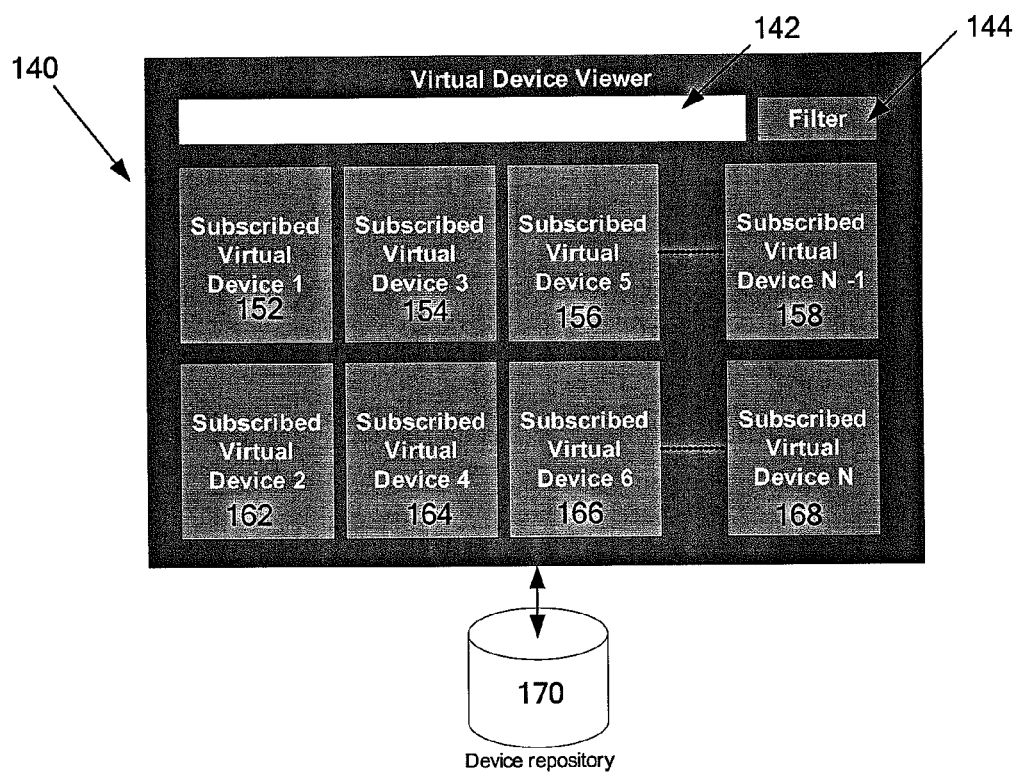
FIG. 4 shows the structure of a sample application implementing the virtual device subscription and viewing module.

The virtual device subscription and viewing module 140, illustrated in FIG. 4, is responsible for assisting users search, aggregate, and organize interested virtual devices for their viewing. Users can subscribe to multiple virtual devices and organize them under user-defined categories. As a sample embodiment, the subscription and organization of virtual devices can be implemented via standard relational database through which all subscription association relationships between user and virtual device entities as well as parent-child relationships in user-defined categorization can be managed. Although virtual devices may be embedded in web sites or start pages in an add-hoc manner because of its widget like configuration, it is contemplated that in the present invention there are special applications that provide easier searching of virtual devices and allow additional options for virtual device display. The searching capability of the published virtual devices can be provided by relational database servers such as MySQL server, or file based text search engine such as Apache Lucene and the searching can be based on keywords associated with information including but not limited to the device owners, the functions of the devices, or the widgets. For example, a keyword maybe the name of a user so that the search engine can locate devices that are related to the user, or a tag such as "politics" so that the search engine can locate devices and widgets that have been tagged with the "politics" keyword. Similar to how the device manager manages the viewing of widgets, this module supports a similar type of viewing configuration for the viewing of multiple virtual devices within the module.

Figure 3:
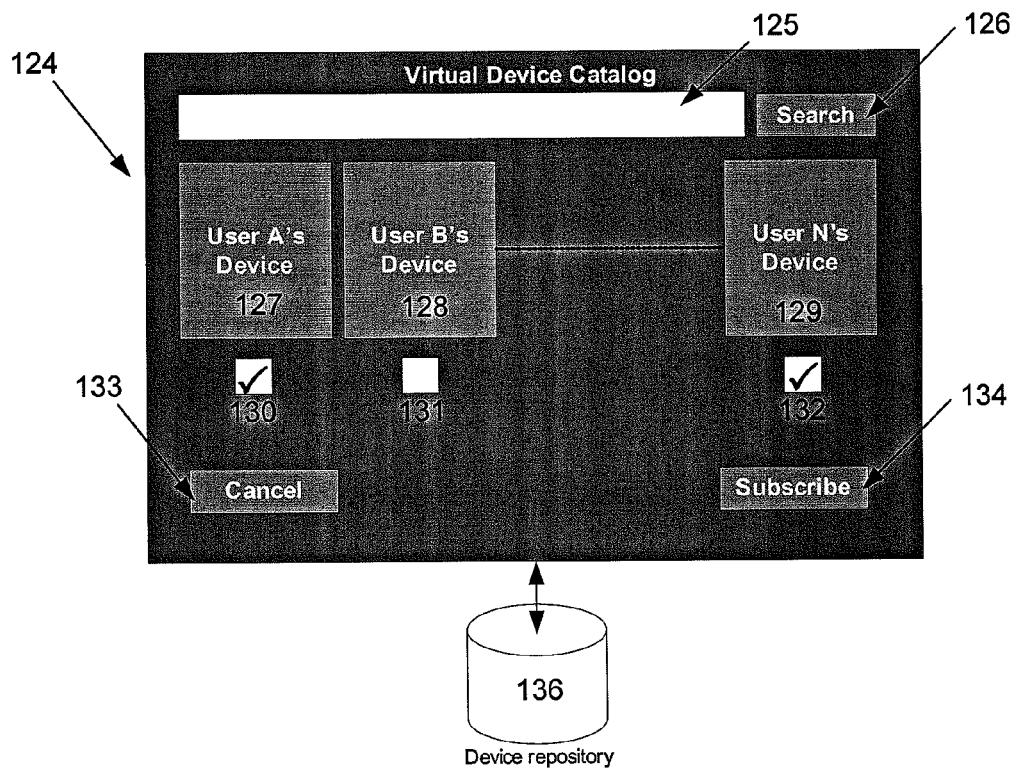
FIG. 3 shows the structure of a sample application implementing the virtual device subscription and viewing module.

The virtual device includes a virtual device catalog 124, such as that disclosed in FIG. 3. The catalog 124 illustrated is configured to display all virtual devices searched by a user. Virtual devices searched by a user are the virtual devices, owned by other users that a user has identified as those that the user may desire to utilize. FIG. 3 is an illustration of a catalog 124 that displays a plurality of virtual device displays 127, 128, 129 based on key word(s) searched by a user. The virtual devices that a user searches are stored in a device repository 136 and retrieved upon a user engaging the search button 126. The search function, which is initiated by engaging the search button 126, is configured to retrieve all virtual devices available when no filter term is entered into search field 125. Alternatively, the virtual devices retrieved from the repository may be those associated with the search term entered into search field 125. For example, if the term music is entered into search field 125 and a filter is performed by engaging the search function 126, only those virtual devices associated with the term music will be retrieved from the device repository 136 and displayed. Each virtual device is associated with one or more terms in order to facilitate select retrieval through use of the search function. A user may then check the ones a user prefers in the check boxes area 130, 131, 132, and engages the subscribe function 134 to subscribe to those virtual devices for future access. The access of the subscribed virtual devices will be discussed in the next paragraph.

Within the virtual device, it includes a special viewer, such as that disclosed in FIG. 4. The viewer 140 illustrated is configured to display all virtual devices to which a user subscribes. Virtual devices to which a user subscribes are the virtual devices, owned by other users, to which a user has identified as those that the user may desire to utilize. For example, a user may have a plurality of virtual devices configurations to which they are subscribed. FIG. 4 is an illustration of a viewer 140 that displays a plurality of virtual device displays 152, 154, 156, 158, 162, 164, 166, 168 to which a user subscribes. The virtual devices to which a user subscribes are stored in a device repository 170 and retrieved upon the startup of the virtual device viewer 140. The virtual device viewer 140 may also equip with a filter function 144. The filter function, which is initiated by engaging the filter button 144, is configured to retrieve all virtual devices to which a user is subscribed when no filter term is entered into filter field 142. Alternatively, the virtual devices retrieved from the repository may be those associated with the filter term entered into search field 142. For example, if the term music is entered into filter field 142 and a filter is performed by engaging the filter function 144, only those virtual devices associated with the term music will be retrieved from the device repository 170 and displayed. The device repository 170 in FIG. 4 is identical to the device repository 136 in FIG. 3. Each virtual device is associated with one or more terms in order to facilitate select retrieval through use of the filter function.

Figure 5:
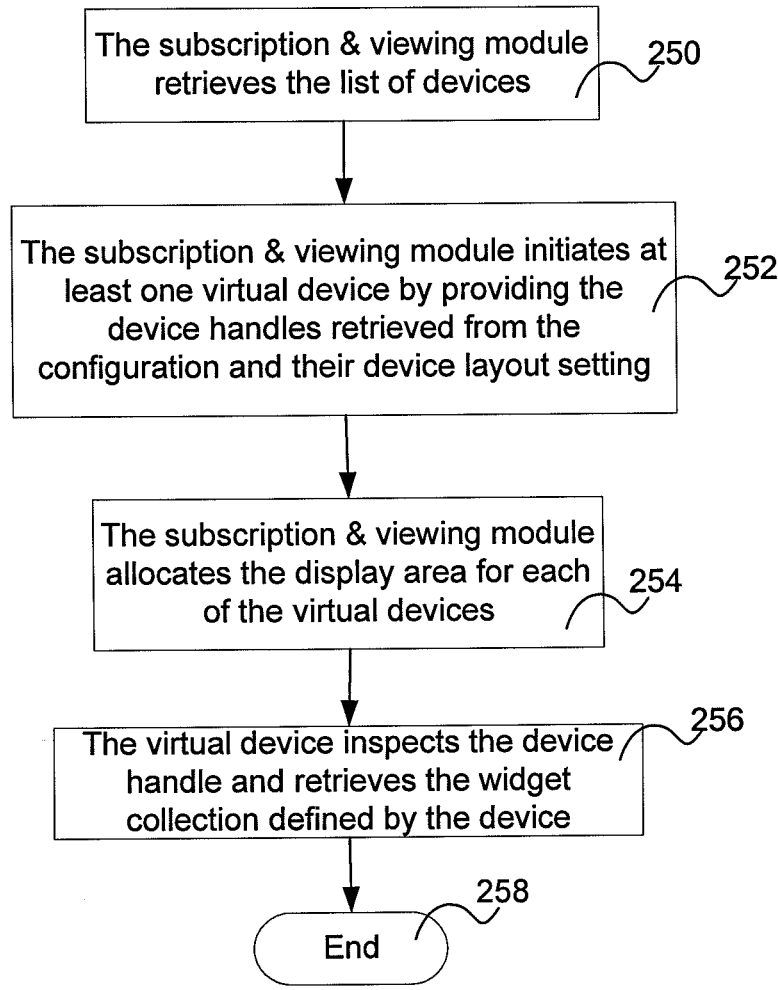
FIG. 5 illustrates the mechanisms behind the operations of the virtual device.

As shown in FIG. 5, the subscription and viewing module has a sequence that facilitates the retrieval of a list of virtual devices 250. It also initiates at least one of the virtual devices to which the user subscribes by providing the device handle that is retrieved from the configuration and the device layout setting 252. The subscription and viewing module also allocates the display area for each of the virtual devices 254. Upon initiation of the virtual device, it inspects the device handle and retrieves the widget collection defined by the virtual device 256, ending the sequence 258.

Figure 6:
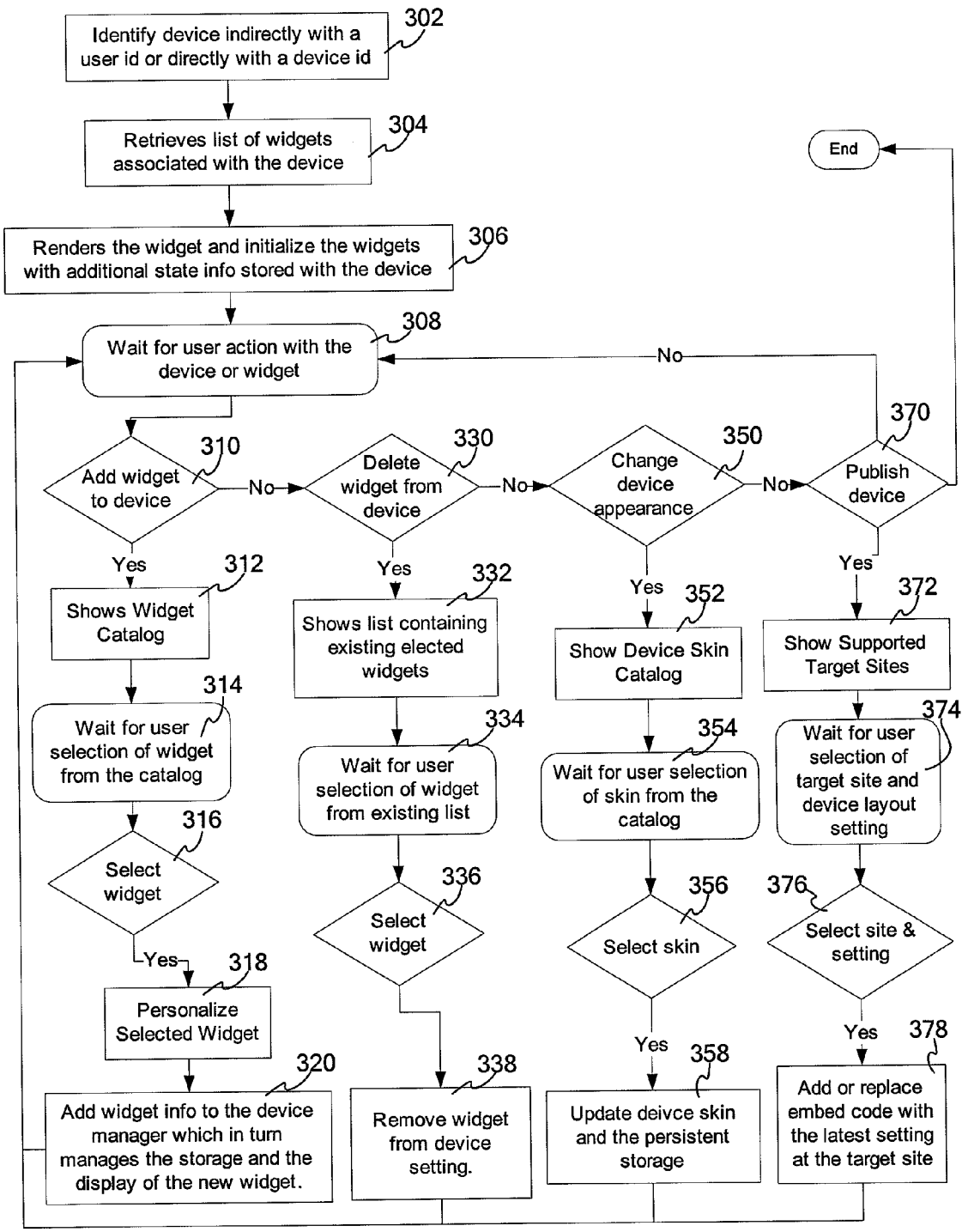
FIG. 6 shows the activity flow of the virtual device application for viewing and update purpose.
Figure 7A:
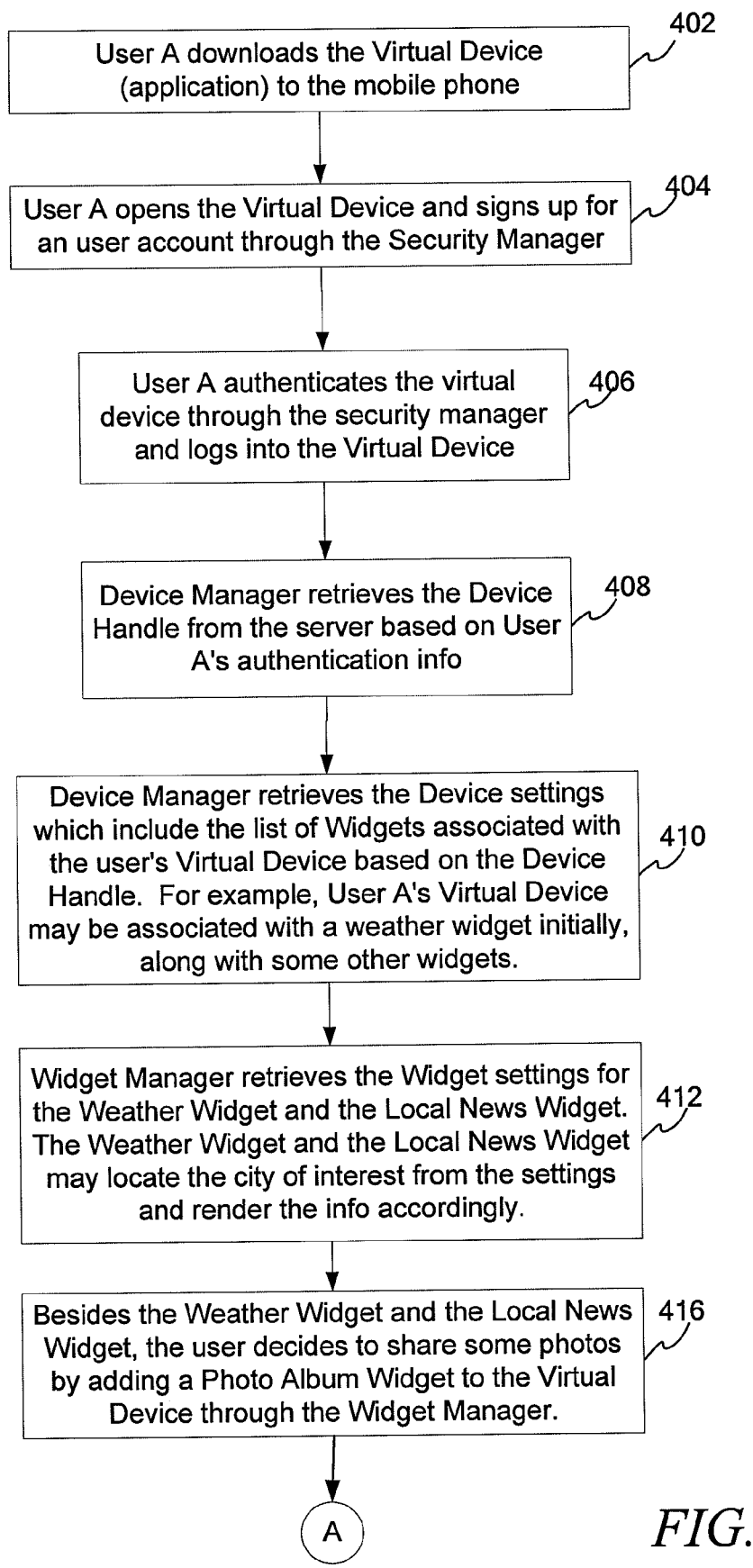
FIG. 7A-7D illustrates functional operation of the virtual device.
Figure 7B:
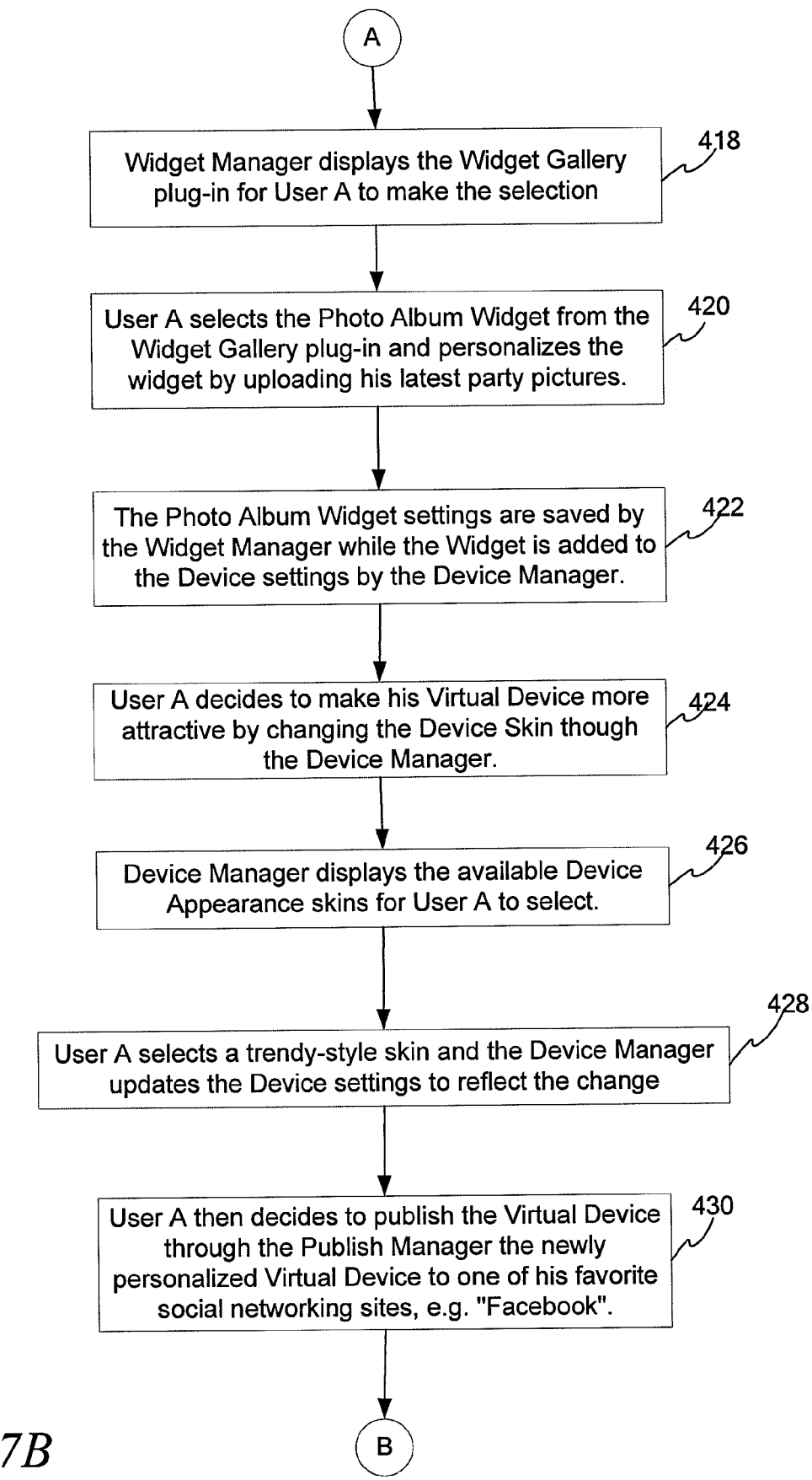
Figure 7C:
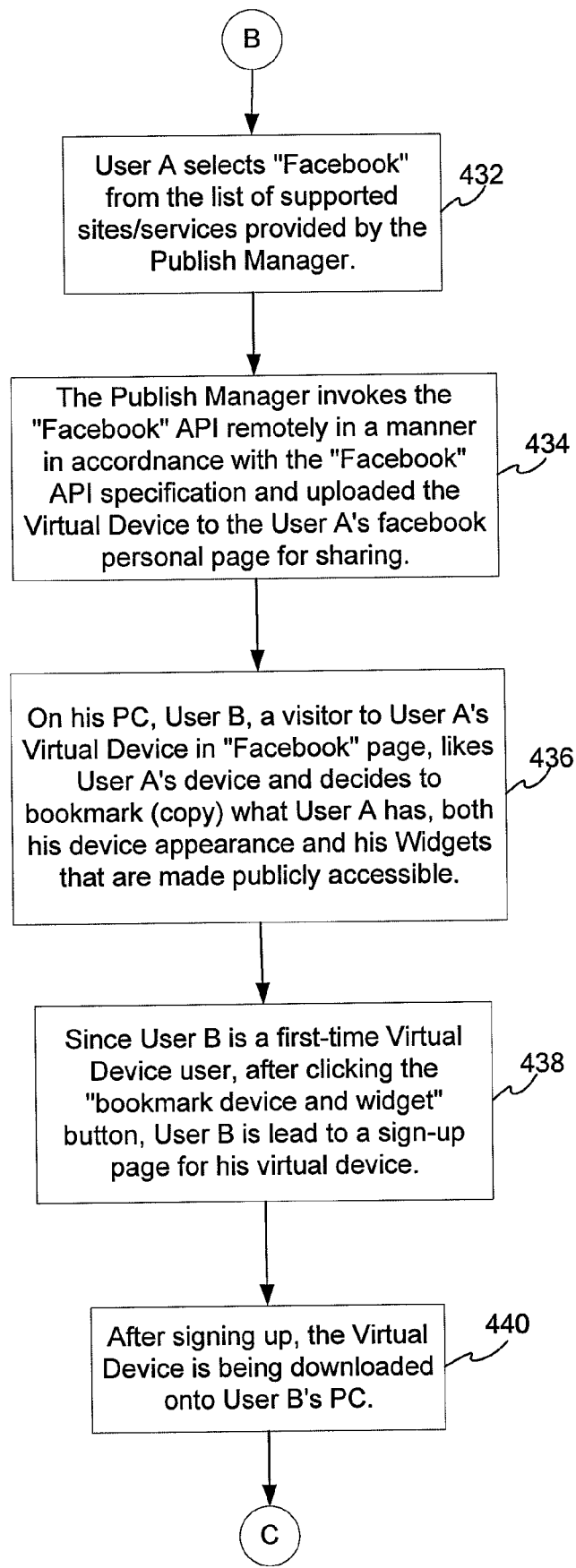
Figure 7D:
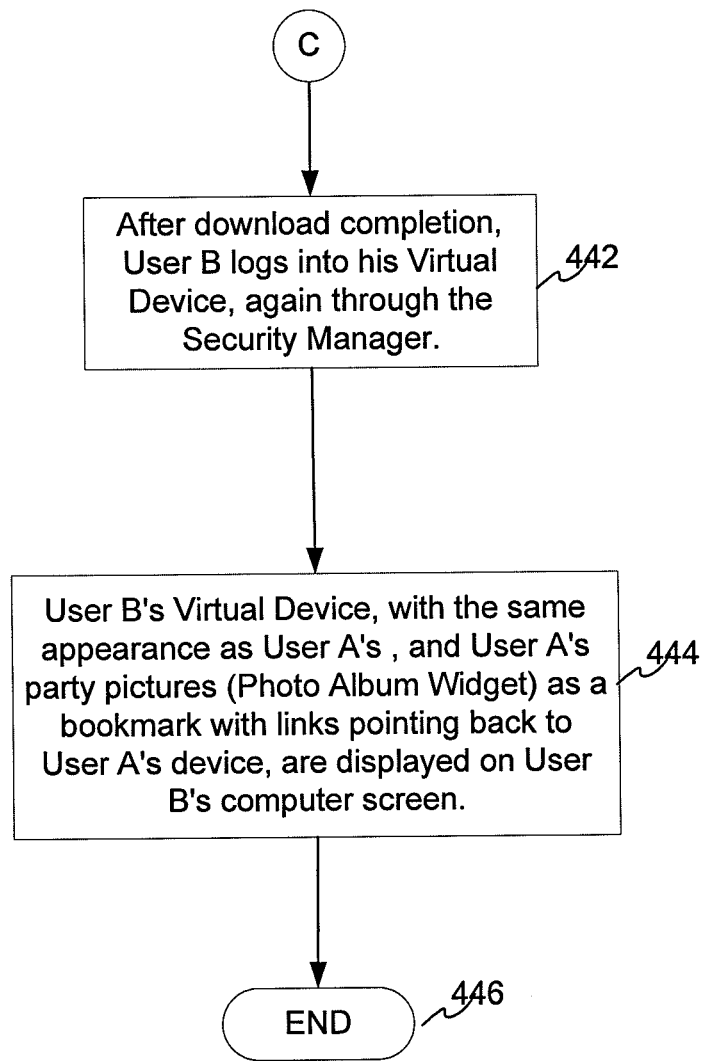

FIG. 6 is an illustration of the process flow during user operation of a virtual device. Upon initiation of a virtual device by a user, the virtual device is identified indirectly by the user inputting a user identification number, or directly by the device upon which the virtual device is embedded with a device identification number 302. Next, the virtual device retrieves a list of widgets associated with the virtual device 304 from data storage. Next, the virtual device renders the widgets available and initializes the widgets rendered with additional state information retrieved from data storage 306. The virtual device then goes into a standby state, while it waits for action by the user 308. In this standby state, the user is presented with the option of choosing to add a widget to the device 310, delete a widget from the device 330, change the appearance of the device 350 or publish the virtual device 370. If the user desires to add a new widget 310, the virtual device module presents the user with a widget catalog 312, and waits for the user to make a selection 314 of a widget from the widget catalog. After the user selects a widget 316, the virtual device presents the user with an opportunity to personalize the widget selected 318. Following the widget personalization option, information regarding the widget selected is added to the device manager which manages the storage and display of the new widget 320. After adding the widget selected to the device manager, the virtual device returns back to its standby state 308 where it waits for additional action by the user.

If the user does not desire to add a new widget 310, the virtual device module presents the user may select to delete a widget from the virtual device 330. If such an election is made, the virtual device shows a list containing the existing elected widgets 332 that have been previously added to the virtual device. The virtual device waits for the user to make a selection 334 from the list of existing widgets that the user desires to delete from the device. After the user selects the widgets that the user desires to remove from the device 336, the virtual device removes the widget from the device setting 338. After deleting the widget selected from the device setting, the virtual device returns back to its standby state 308 where it waits for additional action by the user.

If the user does not desire to add a new widget 310 or delete a widget from the virtual device 330, the user may desire to change the appearance of the virtual device 350. If an election to change the appearance of the virtual device is made, the virtual device shows a catalog illustrating device skins 352. The virtual device waits for the user to make a selection from the catalog 354 of the device skin that is representative of the appearance for the virtual device desired by the user. After the user selects a device skin 356, the virtual device updates the virtual device skin stored in data storage 358. After updating the device skin, the virtual device returns back to its standby state 308 where it waits for additional action by the user.

If the user does not desire to add a new widget 310, delete a widget from the virtual device 330, or change the appearance of the virtual device 350, the user may elect to publish the virtual device 370. If the publish device option is elected 370, the virtual device presents a list of supported target sites 372 that the virtual device may be published through, and the device layouts that may be supported at the site to which the virtual device is to be published. The virtual device waits for the user to make a selection of target sites at which it is desired to have the virtual device published 374 and a selection of a layout for the virtual device. After the user selects the target sites and the layout settings for the device to published 376, the virtual device sends the latest setting to the targeted sites though the API provided by those site. After adding or replacing code with the latest setting at the target site 378, the virtual device returns back to its standby state 308 where it waits for additional action by the user. If the user does not desire to add a new widget 310, delete a widget from the virtual device 330, change the appearance of the virtual device 350, or publish the virtual device 370, the process is complete.

An example of how a virtual device is created and operated is illustrated in FIG. 7A-7D. As illustrated, a user may download the virtual device application to mobile phone 402. The user then opens the virtual device and signs up for a user account through the virtual device security manager 404. Next the user authenticates the virtual device through the security manager and logs into the virtual device 406. The device manager reties the device handle form the server based on the user's authentication information 408. Next, the device manager retrieves the device settings which include the list of widgets associated with (subscribed to) the user's virtual device based on the device handle. For example a user's virtual device may be associated with a weather widget initially along with a local news widget and a few other popular widgets 410. The widget manager then retrieves the widget settings for the weather widget and the local news widget. The weather and local news widgets may locate the city of interest from the settings and render the information accordingly 412. Next the user may decide to share photographs by adding a photo album widget to the virtual device through the widget manager 416. The widget manager displays the widget gallery plug-in for the user 418 so that the user may select the photo album widget from the widget gallery plug-in. The user is then allowed to personalize the widget by uploading their latest pictures to the widget 420. The photo album widget settings are saved by the widget manager while the widget is added to the device settings by the device manager 422.

Next, the user decides to make their virtual device more attractive by changing the device skin through the device manager 424. The device manager displays the available device appearance skins for the user to select a desired device skin 426. After the user selects a skin, the device manager updates the device settings to reflect the change 428. The user may then publish the virtual device through the publish manager to another site, such as one of the popular social-networking sites such as Facebook 430. Upon the user selection of Facebook from a list of supported sites or services presented to the user by the Publish Manager 432, the Publish Manager invokes the Facebook API remotely in accordance with the Facebook API specification and uploads the virtual device to the user's Facebook personal page for sharing 434. On the second user's PC, this user, user B, a visitor to the first user's (user A) virtual device in a Facebook page, likes user A's device and decides to bookmark (copy) what user A has, both user A's device appearance and User A's widgets that are made publically available 436. Since user B is a first time virtual device user, after selecting the bookmark device and widget button, user B is directed to a sign up page for user B's virtual device 438. After signing up, the virtual device is downloaded onto user B's PC 440. Next, user B logs into user B's virtual device through the security manager 442. User B's virtual device, which has the same appearance as user A's virtual device also has user A's pictures, from the photo album widget, as a bookmark with links pointing back to user A's virtual device. The photos are thereby displayed on user B's computer screen 444, completing the virtual device processing 446.

Figure 8:
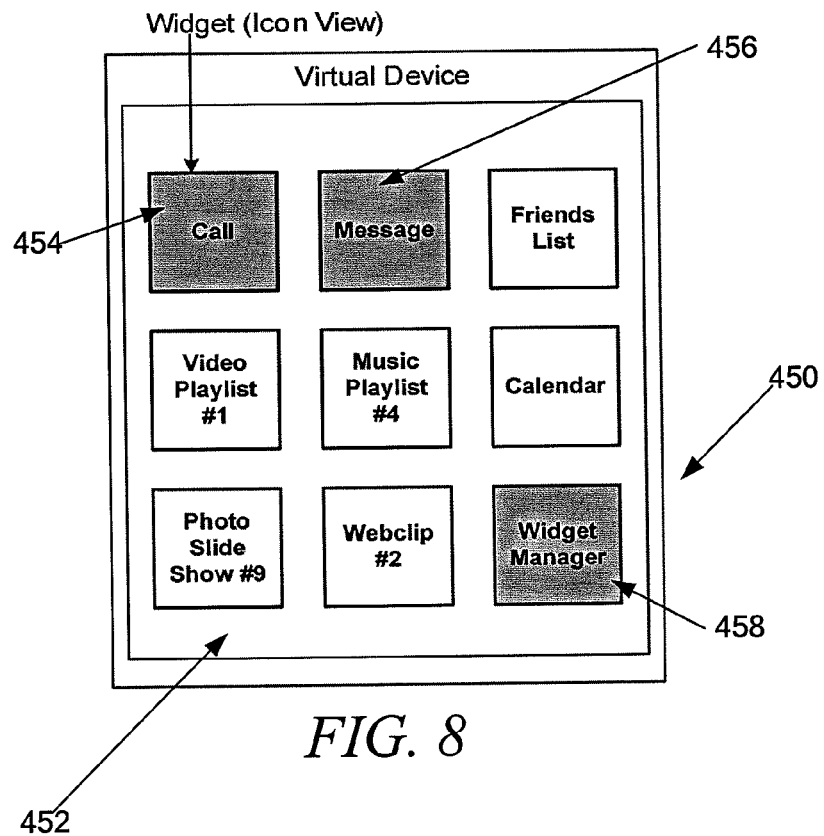
FIG. 8 illustrates a virtual device GUI illustrating a private widget icon view.
Figure 9:
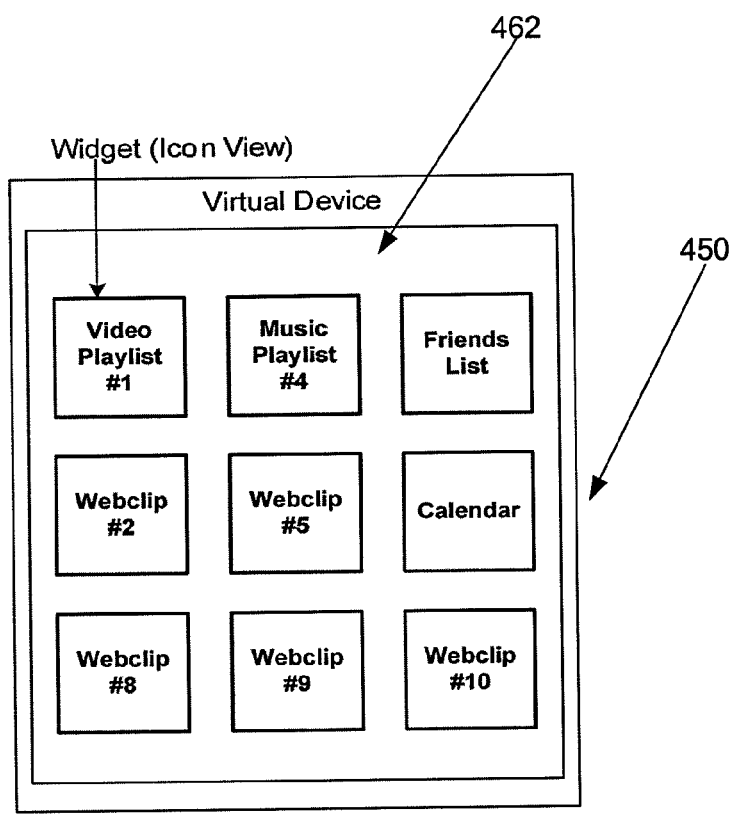
FIG. 9 illustrates a virtual device GUI illustrating a public widget icon view.
Figure 10:
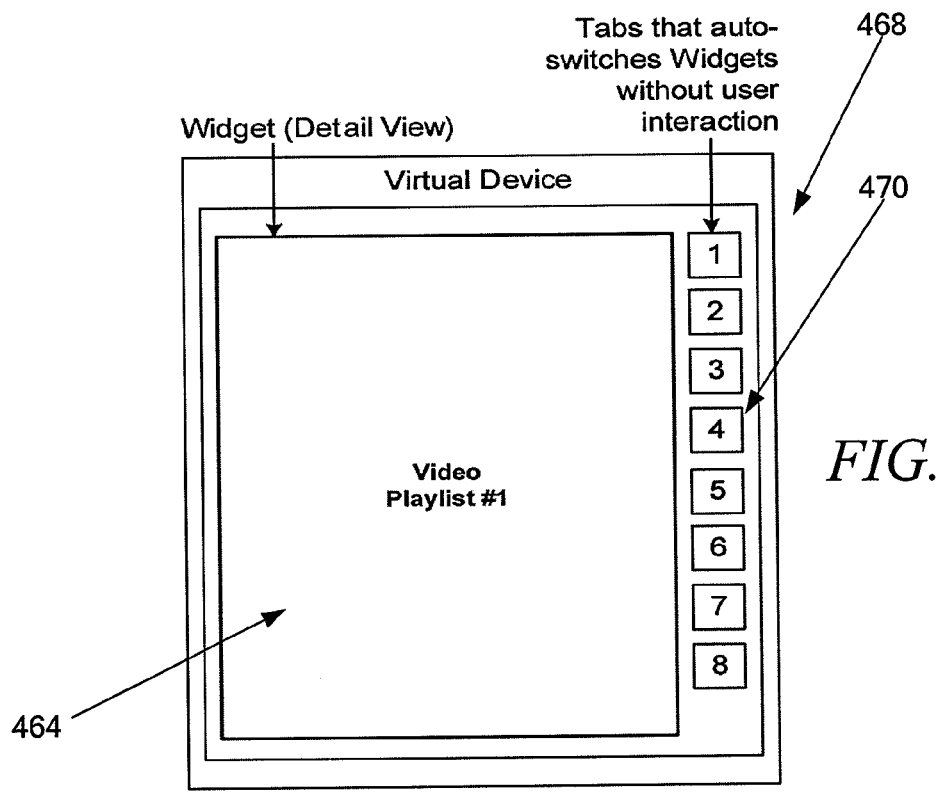
FIG. 10 illustrates a virtual device GUI illustrating a widget switching navigation mode.

Referring to FIG. 8, is an illustration of a user's private view (owner view) of the user's virtual device 450, illustrating the widget icons 452 associated with applications within the virtual device 450 in the embodiment shown including call manager, message box, friends list, video playlist, music playlist, calendar, photo slide show, web clip and widget manager. FIG. 9 is a public view (visitor view) of the user's virtual device 450, illustrating the widget icons 462 associated with applications within the virtual device 450 in the embodiment shown including a plurality of widget icons. The private view of the user's virtual device 450 includes widget icons call manager 454, message box 456 and widget manager 458. FIG. 9 does not include the call manager, message box and widget manager, because these icons are unique to the owner's virtual device and thereby invisible to all virtual device visitors. FIGS. 8 and 9 illustrate the concept that the actual widgets displayed in a user's virtual device are also dependent upon the classification assigned to the widget. Widgets that are designated as owner specific shall not be displayed to visitors to which the virtual device is distributed. FIG. 10 is an alternative embodiment of the virtual device display 468, illustrating a detail view of one of the icons 1-8 that are stacked down the right hand side of the virtual device display. In the embodiment illustrated, a detailed view 464 of video playlist #1 of icon four 470 is shown. An added feature of the embodiment illustrated in FIG. 10 is that the detail view of each of the icons within the virtual device has its detailed view displayed for a period of time automatically in a cycled timing presentation.

Figure 11:
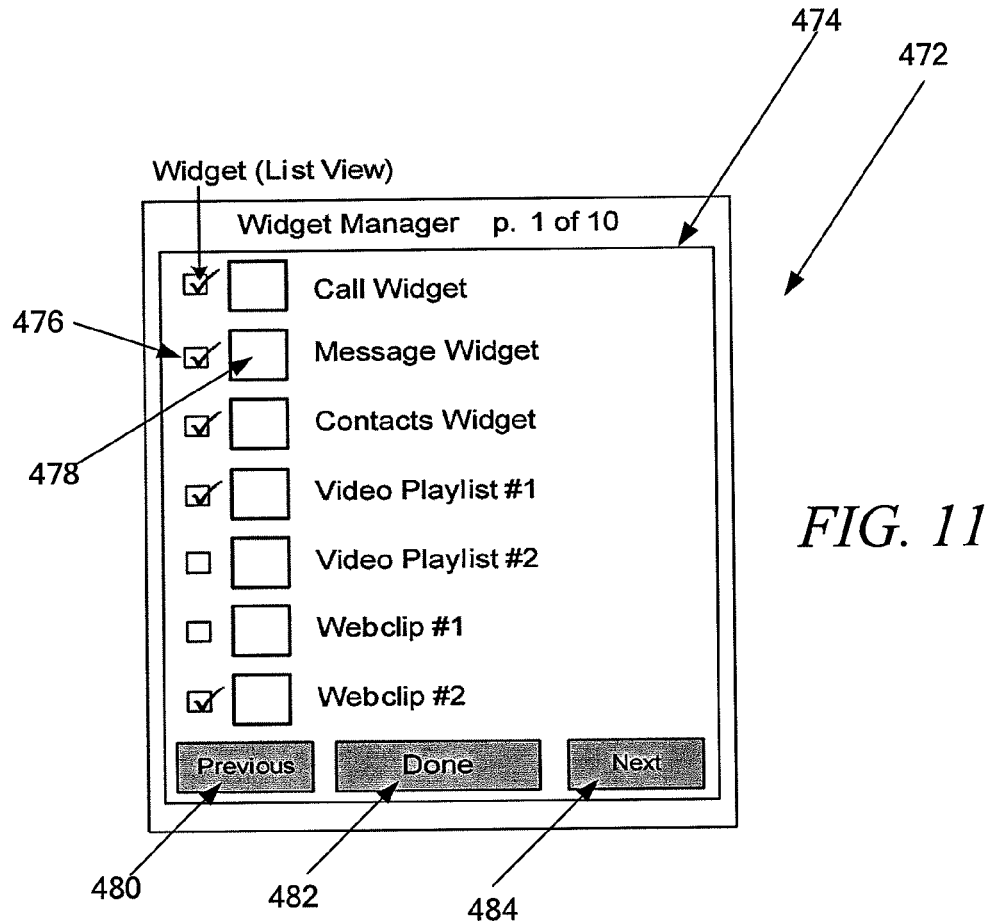
FIG. 11 illustrates a virtual device GUI illustrating a widget manager module.

FIG. 11 is an illustration of the virtual device 472 displaying the widget gallery plug-in functionality that facilitates the selection of widgets to be subscribed to or added to the virtual device. In the embodiment illustrated, the virtual device 472 displays the widget manager 474 presents a list of potential widgets that may be subscribed to in a virtual device. In the embodiment shown, the user has selected to add the call manager widget, the message widget, the video playlist #1 and web clip #2 as the widgets to be added to the virtual device. Widgets are selected by entering a check in the box 476 next to the widget 478 that is to be added to the virtual device.

Figure 12:
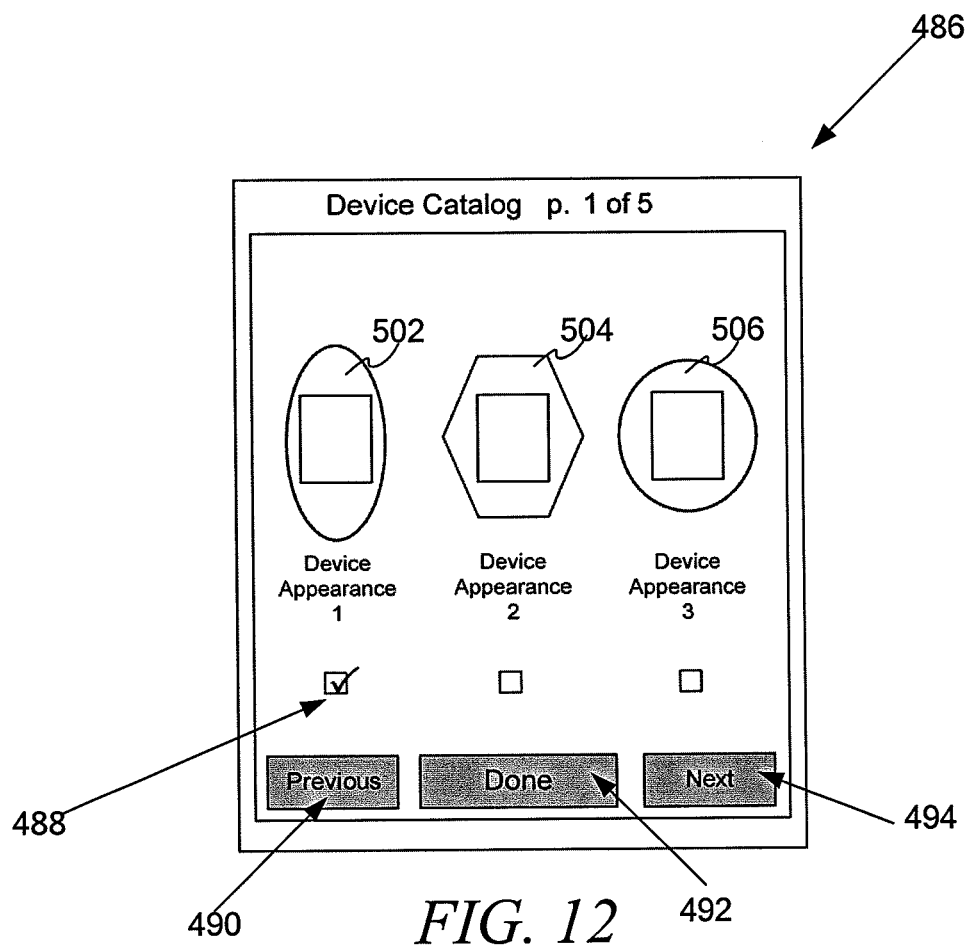
FIG. 12 illustrates a virtual device GUI illustrating a device appearance catalog.

FIG. 12 is an illustration of the virtual device 486 displaying the appearance catalog, whereby a user may select an appearance skin for the virtual device 486 from a plurality of possible appearance skins. In the embodiment illustrated, the user may select one of three device appearances 502, 504, 506. As illustrated, device appearance 502 is selected by entering a check in the box 488 next to device appearance 502. Buttons 490, 492, and 494 allow a user to navigate through the potential device appearances that may be selected.

Figure 13:
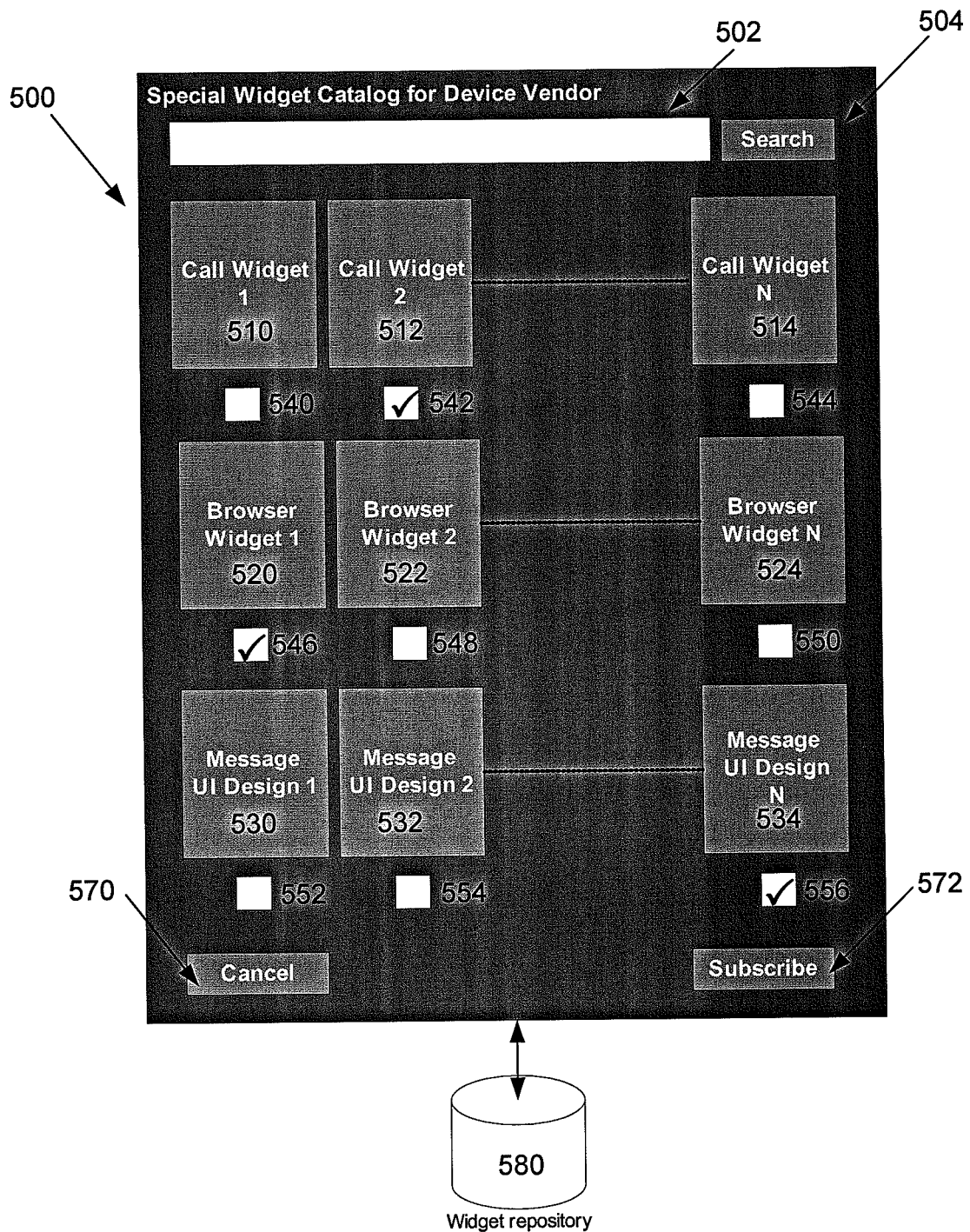
FIG. 13 illustrates a virtual device GUI illustrating a special widget catalog for device vendor.

Another object of the invention is to allow hardware and software providers, including but not limited to device OEMs/ODMs, e.g. mobile phone OEMs/ODMs, to utilize the virtual device as a phone software platform implemented on top of the device operating system. Software developers may utilize the device module to package a suite of software applications. FIG. 13 is an illustration of a special widget catalog 500 that serves as templates for the hardware or software provider to select and customize user interfaces and functioning components for the virtual device software platform. As illustrated, there could be multiple suppliers for the same device function, e.g. Voice over Internet Protocol (VoIP) call widget 510, 512, 514, different browsers 520, 522, 524, and different message user interface layout design templates 530, 532, 534, etc. for the hardware of software provider to choose from. This allows the hardware or software provider to not only have customizable device user interface templates and built-in functional components as an integrated software platform, but also a virtual device platform that may be customized/personalized, accessible and shareable through the Internet. The hardware or software provider may select the desirable components and user interface templates by checking in the appropriate check boxes, 540, 542, 544, 546, 548, 550, 552, 554, 556. By engaging the subscribe button 572, the selected widgets will be included with the virtual device. The special widget catalog 500 may also be equipped with a search function 504. The search function, which is initiated by engaging the search button 504, is configured to retrieve all widgets available and associated with a device design when no search term is entered into search field 502. Alternatively, the virtual devices retrieved from the widget repository 580 may be those associated with the search term entered into search field 502. For example, if the term browser is entered into search field 502 and a search is performed by engaging the search function 514, only those widgets associated with the term browser will be retrieved from the widget repository 580 and displayed. Each widget is associated with one or more terms in order to facilitate select retrieval through use of the search function.

While certain features and embodiments of the invention have been described, other embodiments of the invention will be apparent to those skilled in the art from consideration of the specification and practice of the embodiments of the invention disclosed herein. Furthermore, although embodiments of the present the virtual device 450 within the virtual device in the embodiment shown invention have been described as being associated with data stored in memory and other storage mediums, one skilled in the art will appreciate that these aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A non-transitory computer-readable medium storing a virtual device module operatively configured to function in computing systems of a plurality of devices, wherein the virtual device module is operatively configured to provide an interface that provides:
   access to content stored within data storage of the plurality of devices,
   updates to content stored within data storage of the plurality of devices, and
   access to a plurality of services provided by a plurality of widgets contained in at least one virtual device which is managed by the virtual device module, the plurality of services comprising information, entertainment, social-networking, messaging and telephony, the virtual device module further comprising a device manager which is utilized to:
      layout the plurality of widgets on a computing device display area by partitioning the display area into a plurality of categories, each of the plurality of categories only displaying widgets belonging to a predetermined classification,
      sort the display of the widgets belonging to the predetermined classification according to a most recent update time associated with each of the widgets,
      automatically playback one or more of the plurality of widgets according to a defined playback sequence in response to an idle detection operation in the virtual device, the idle detection operation comprising:
         listening to at least one of user provided input and pointing device events, and
         starting the automatic playback of the one or more of the plurality of widgets according to the defined playback sequence only when at least one of a user provided input and a pointing device performs an action outside of a screen area for the virtual device,
   wherein the plurality of widgets are contained in a widget container module, the widget container module providing for centralized addition and deletion of the plurality of widgets, the widget container module being embedded in a profile section associated with each of a plurality of social-networking sites, the plurality of social-networking sites being updated in a centralized manner by receiving updates to one or more of the plurality of widgets contained within the widget container module, the updates comprising an addition or deletion of one or more of the plurality of widgets from each of the plurality of social networking sites associated with widget container module.

2. The virtual device module of claim 1, wherein the widget container module is configured as part of a distributed infrastructure that is operatively configured to allow users to subscribe, embed and organize a multitude of customized virtual devices, wherein the virtual device module is further operatively configured to be published and at least one of shared with and subscribed by other users with respect to all of the plurality of widgets and with respect to a personalized layout of a graphical user interface associated with the virtual device.

3. The virtual device module of claim 1 wherein the virtual device module is configured to allow users and service providers to manage a virtual device GUI.

4. The virtual device module of claim 3 operatively configured to facilitate the a personalization of a layout of the virtual device GUI, wherein the virtual device module is further operatively configured to be published and at least one of shared with and subscribed by other users with respect to all of the plurality of widgets and with respect to the personalized layout of the virtual device GUI.

5. A non-transitory computer-readable medium storing software for a universal interface module that may be experienced by users across a plurality of computing devices, wherein the universal interface module is configured to be embedded in the operating system of the plurality of computing devices, wherein each of the plurality of computing devices includes at least a processor, memory and device display, wherein a virtual device module is stored in the memory of each of the plurality of computing devices and is operatively configured to present to a user of each one of the plurality of computing devices a GUI that has a universal appearance and functionality across all of the plurality of computing devices, the virtual device module managing a virtual device, the virtual device containing a plurality of widgets for providing access to a plurality of services, the plurality of services comprising information, entertainment, social-networking, messaging and telephony, the virtual device module further comprising a device manager which is utilized to layout the plurality of widgets on a computing device display area by partitioning the display area into a plurality of categories, each of the plurality of categories only displaying widgets belonging to a predetermined classification, wherein the device manager is further utilized to sort the display of the widgets belonging to the predetermined classification according to a most recent update time associated with each of the widgets, wherein the device manager is further utilized to automatically playback one or more of the plurality of widgets according to a defined playback sequence in response to an idle detection operation in the virtual device, wherein the idle detection operation comprises listening to at least one of user provided input and pointing device events and starting the automatic playback of the one or more of the plurality of widgets according to the defined playback sequence only when at least one of a user provided input and a pointing device performs an action outside of a screen area for the virtual device, wherein the plurality of widgets are contained in a widget container module, the widget container module providing for centralized addition and deletion of the plurality of widgets, the widget container module being embedded in a profile section associated with each of a plurality of social-networking sites, the plurality of social-networking sites being updated in a centralized manner by receiving updates to one or more of the plurality of widgets contained within the widget container module, the updates comprising an addition or deletion of one or more of the plurality of widgets from each of the plurality of social networking sites associated with widget container module.

6. A non-transitory computer-readable medium storing software for a universal content management interface configured to enhance a user's experience with using a plurality of different physical devices, by providing a dynamic graphical user interface ("GUI") operatively configured to function and appear in the same manner on all the plurality of different devices, wherein the universal content management interface is operatively configured to provide the following:
- access to content,
- updates to content, and
- access to the plurality of different services through a plurality of widgets accessible through the universal content management interface, the plurality of widgets being contained in at least one virtual device which is managed by the universal content management interface, the plurality of different services comprising information, entertainment, social-networking, messaging and telephony, the universal content management interface further comprising a device manager which is utilized to:
  - layout the plurality of widgets on a computing device display area by partitioning the display area into a plurality of categories, each of the plurality of categories only displaying widgets belonging to a predetermined classification,
  - sort the display of the widgets belonging to the predetermined classification according to a most recent update time associated with each of the widgets,
  - automatically playback one or more of the plurality of widgets according to a defined playback sequence in response to an idle detection operation in the virtual device, the idle detection operation comprising:
    - listening to at least one of user input and pointing device events, and
    - starting the automatic playback of the one or more of the plurality of widgets according to the defined playback sequence only when at least one of a user input and a pointing device performs an action outside of a screen area for the virtual device,
- wherein the plurality of widgets are contained in a widget container module, the widget container module providing for centralized addition and deletion of the plurality of widgets, the widget container module being embedded in a profile section associated with each of a plurality of social networking sites, the plurality of social networking sites being updated in a centralized manner by receiving updates to one or more of the plurality of widgets contained within the widget container module, the updates comprising an addition or deletion of one or more of the plurality of widgets from each of the plurality of social networking sites associated with widget container module.

7. The universal content management interface of claim 6 wherein the dynamic GUI may be customized by the user and distributed and shared with all of the plurality of different devices.

8. The universal content management interface of claim 6 wherein, following the integration of the content management interface the dynamic GUI provides access to any of a plurality of device applications available on any one of the plurality of different devices.

9. A non-transitory computer-readable medium storing a virtual device module operatively configured to function as a user interface and component platform for physical device OEMs/ODMs, wherein the virtual device module is integrated and implemented on top of the device operating system, and software developers, wherein the device module is utilized to package a suite of software applications, the virtual device module managing a virtual device, the virtual device containing a plurality of widgets for providing access to a plurality of services, the plurality of services comprising information, entertainment, social-networking, messaging and telephony, the virtual device module further comprising a device manager which is utilized to: layout the plurality of widgets on a computing device display area by partitioning the display area into a plurality of categories, each of the plurality of categories only displaying widgets belonging to a predetermined classification, sort the display of the widgets belonging to the predetermined classification according to a most recent update time associated with each of the widgets, automatically playback one or more of the plurality of widgets according to a defined playback sequence in response to an idle detection operation in the virtual device, the idle detection operation comprising: listening to at least one of user input and pointing device events, and starting the automatic playback of the one or more of the plurality of widgets according to the defined playback sequence only when at least one of a user input and a pointing device performs an action outside of a screen area for the virtual device, wherein the plurality of widgets are contained in a widget container module, the widget container module providing for centralized addition and deletion of the plurality of widgets, the widget container module being embedded in a profile section associated with each of a plurality of sites, the plurality of sites being updated in a centralized manner by receiving updates to one or more of the plurality of widgets contained within the widget container module, the updates comprising an addition or deletion of one or more of the plurality of widgets from each of the plurality of sites associated with widget container module.

10. The virtual device module of claim 9 further configured to function as an internet-accessible device user interface and component platform.

11. The virtual device module of claim 9 further configured to function as an interface for hardware and software providers, wherein the device module may be implemented in at least one of a physical device and software.

* * * * *